United States Patent [19]
Walisser

[11] Patent Number: 5,916,966
[45] Date of Patent: Jun. 29, 1999

[54] STABILIZED PHENOLIC RESIN MELAMINE DISPERSIONS AND METHODS OF MAKING SAME

[75] Inventor: Wayne Richard Walisser, Floyds Knobs, Ind.

[73] Assignee: Borden Chemical, Inc., Columbus, Ohio

[21] Appl. No.: 08/704,259

[22] Filed: Aug. 28, 1996

Related U.S. Application Data

[63] Continuation-in-part of application No. 08/468,141, Jun. 6, 1995, abandoned.

[51] Int. Cl.[6] .................................................. C08G 14/10
[52] U.S. Cl. ........................ 524/594; 524/595; 524/596; 528/163; 528/165
[58] Field of Search ...................................... 524/594, 595, 524/596; 528/163, 165

[56] References Cited

U.S. PATENT DOCUMENTS

| | | | |
|---|---|---|---|
| 3,956,204 | 5/1976 | Higginbottom | 524/25 |
| 3,956,205 | 5/1976 | Higginbottom | 524/25 |
| 4,028,367 | 6/1977 | Higginbottom | 524/841 |
| 4,069,276 | 1/1978 | Bornstein | 525/497 |
| 4,303,561 | 12/1981 | Piesch et al. | 524/35 |
| 4,393,181 | 7/1983 | Allen | 525/504 |
| 4,499,125 | 2/1985 | Blasing et al. | 428/503 |
| 4,668,785 | 5/1987 | Ebel et al. | 544/196 |
| 4,757,108 | 7/1988 | Walisser | 524/596 |
| 4,960,826 | 10/1990 | Walisser | 524/494 |
| 5,296,584 | 3/1994 | Walisser | 528/163 |
| 5,358,748 | 10/1994 | Mathews et al. | 427/389.8 |
| 5,368,803 | 11/1994 | Brow et al. | 264/257 |

*Primary Examiner*—Marion McCamish
*Assistant Examiner*—John J. Guarriello
*Attorney, Agent, or Firm*—Stevens, Davis, Miller & Mosher, L.L.P.

[57] ABSTRACT

Disclosed is a stabilized phenolic resin melamine dispersion comprising a liquid alkaline resole resin composition and solid melamine crystal dispersed throughout the resin composition. The liquid alkaline resole resin composition comprises the reaction product of combining formaldehyde and phenol at a formaldehyde to phenol mole ratio of about 0.5:1 to about 3.5:1 in the presence of a basic catalyst. The melamine crystal to phenol mole ratio ranges from about 0.01:1 to about 1:1. Moreover, the composition has a free formaldehyde content of at most about 0.5 weight percent. A method for making this dispersion is also disclosed.

33 Claims, No Drawings

STABILIZED PHENOLIC RESIN MELAMINE DISPERSIONS AND METHODS OF MAKING SAME

This application is a continuation-in-part of application Ser. No. 08/468,141 filed Jun. 6, 1995 now abandoned.

BACKGROUND OF THE INVENTION

1. Field of the Invention

The present invention relates to low free formaldehyde dispersions of melamine crystals in alkaline resole resins and methods of making such dispersions.

2. Background Discussion

Melamine-resole compositions are high water solubility compositions finding use for bonding materials. These compositions are especially useful for bonding glass fiber to make an initially "resinated" glass fiber blanket or mat that is subsequent thermally cured in a mold or some other shaping operation.

High water solubility is normally provided by formulating these resins (e.g., phenol/formaldehyde-resole resins or melamine/formaldehyde resins) with high formaldehyde to phenol molar ratios or with high formaldehyde to melamine molar ratios (near or above 3:1 in either case). Reaction products are respectively monomeric methylol phenols and methylol melamines. The methylol melamines are normally stabilized by further reaction with methanol to form the water soluble methoxy methyl melamine derivatives. A high content of unreacted formaldehyde is therefore often found in prior art resins of these types as a consequence of the high formaldehyde ratios employed to prepare them.

Typically, mixtures of resoles and melamines are heated to effect a melamine formaldehyde reaction to produce a dissolved methylol melamine reaction product (See U.S. Pat. No. 4,960,826). Application of heat to thermally set (polymerize) these types of conventional resole resins in curing operations also causes the release of additional amounts of formaldehyde from condensing methylol groups in the resole resins and from condensing methoxy methyl groups in the melamine resins. The release of irritating formaldehyde gas from resin impregnated, i.e., resinated, glass wool or glass fabrics during molding and shaping operations may be objectionable from an environmental or industrial hygienic point of view.

Formaldehyde release during curing of the resin is also a problem with the well-documented use of mixtures of these two types of resins. It has therefore been necessary and common industrial practice to control formaldehyde evolution into the environment and work place during curing and B-stage (when resin is mixed with substrate) operations, by compounding these methylol phenol and methoxy methyl melamine binders, or mixtures of the two, with significant amounts of urea and/or ammonia. Urea and ammonia have very high reactivities towards free or uncombined formaldehyde and readily affect its capture from aqueous A-stage (prior to mixture with substrate) solution compositions. The products from such scavenging reactions are dissolved methylol urea monomers and hexamine (also called hexamethylenetetramine), respectively. Mixtures containing methylol ureas may still be problematic, however, because the thermally-induced condensation reaction between methylol ureas also releases formaldehyde.

Additionally, the use of urea and particularly ammonia as formaldehyde scavengers results in the formation and release of undesirable trimethylamine through various, thermally-induced decomposition reactions. The formation of trimethyl amine from ammonia and formaldehyde is a well-documented reaction. Trimethylamine, although possibly not as volatile or irritating as formaldehyde, does have an objectionable, foul smelling "fishy" odor. Trimethylamine also has a low human threshold odor limit in the low parts per billion range.

The trimethylamine is particularly noticeable in high density molded articles prepared with high binder contents because the curing operation traps evolved gasses inside the mold, and subsequently inside the glass fiber resin matrix. These gasses give the finished article a long-lasting unpleasant trimethylamine odor. Less dense articles, such as residential thermal insulation that are cured by blowing heated air through the resinated glass wool blanket, may have less odor in the finished article. The escaping trimethylamine gas purged from the curing blanket by the hot air flow nonetheless ends up in the environment. The use of urea and/or ammonia to scavenge or capture formaldehyde in these binders therefore may not satisfy environmental restrictions on fiberglass plants and the increasing quality (odor free) standards for finished products.

These decomposition reactions occur as a result of the inherent thermal instability of urea and its reaction products with formaldehyde and the very high curing temperatures employed; (often above 500° F.) to mold or permanently shape resinated glass wool.

OBJECTS OF THE PRESENT INVENTION

It is an object of the present invention to provide a low formaldehyde phenolic resin-melamine dispersion that avoids the disadvantages and defects of the prior art.

It is another object of the present invention to provide a method for making a low formaldehyde phenolic resin-melamine dispersion.

Various other objects, advantages, and features of this invention will be readily apparent from the following detailed description and appended claims.

SUMMARY OF THE INVENTION

The present invention provides a stabilized phenolic resin melamine dispersion comprising a liquid alkaline resole resin composition comprising (i) the reaction product of combining formaldehyde and phenol at a formaldehyde to phenol mole ratio of about 0.5:1 to about 3.5:1 in the presence of a basic catalyst, and (ii) solid melamine crystal dispersed throughout the resin composition. The melamine crystal to phenol mole ratio is from about 0.01:1 to about 1:1. Moreover, the dispersion has a free formaldehyde content of at most about 0.5 weight percent. The dispersion is stored at a sufficiently low temperature to preserve shelf life and product water tolerance.

The present invention also provides a method for preparing a stabilized phenolic resin melamine dispersion comprising the steps of applying solid melamine crystal to an alkaline resole resin composition. The alkaline resole resin composition comprises the reaction product of combining formaldehyde and phenol at a formaldehyde to phenol mole ratio of about 0.5:1 to about 3.5:1 in the presence of a basic catalyst. The melamine crystal is provided at a melamine crystal to phenol mole ratio of about 0.01:1 to about 1:1.

The present invention effects a solid melamine/solution formaldehyde reaction under ambient (or preferably refrigerated) conditions. This is very advantageous and different from prior processes which apply heat to effect a melamine/formaldehyde reaction to produce a dissolved methylol melamine reaction product. In the present invention the melamine crystal and alkaline resole resin are mixed for a sufficiently long time (at least 24 hours) at a sufficiently low temperature (at most about 75° F.) to cause the melamine crystals to become finely dispersed in the alkaline resole composition and result in a dispersion having a free formaldehyde content of less than about 0.5 weight percent of the dispersion. Use of temperatures of at most about 60° F. is preferred to minimize loss of water tolerance and shelf life of the product. The low formaldehyde levels are achieved because at least a portion of the formaldehyde reacts with the melamine crystals to form methylol melamine.

The unreacted, uncured, A-stage dispersions of the present invention can be applied to a glass mat by driving off any liquid carrier such as organic solvent or water, to produce a dry or high solids dispersion on the mat. The dispersion can then be heat cured during which the melamine is solubilized in the resole, the components react, and crosslinking results in amino methyl linkages. The term "A-stage" resin or dispersion means the resin or dispersion when it is made in solution prior to mixing with a substrate.

The present invention has numerous advantages. The present invention provides a dispersion which has a low free formaldehyde content without the need for a heating step often carried out to effect a reaction between the added melamine and the free formaldehyde in the resins. Such a heating step may adversely affect the water solubility and subsequent shelf life of the finished resin. Water solubility is important as these resins are applied as very low solid solutions in water. The resulting dispersion is also stable enough for storage and transport. The present invention also provides a one piece binder system to eliminate the need for expensive solids handling and mixing equipment in customers' plants. Moreover, the exceptionally fine particle size of the dispersed melamine crystals in the resin makes the binder suitable for conventional application through fine tipped spray nozzle application equipment. The present invention also provides phenolic resole resin melamine dispersions having greater water tolerance and shelf life. The present invention also achieves low formaldehyde levels without use of formaldehyde scavengers.

DETAILED DESCRIPTION OF THE PREFERRED EMBODIMENTS

The present invention provides a stabilized phenolic resole resin melamine dispersion. The dispersion comprises a liquid alkaline resole resin composition and solid melamine crystal dispersed throughout the resin composition. The resole resin comprises the reaction product of combining formaldehyde and phenol at a formaldehyde to phenol mole ratio of about 0.5:1 to about 3.5:1 in the presence of a basic catalyst. The melamine crystal to phenol mole ratio is from about 0.01:1 to about 1:1. Moreover, the dispersion has a free formaldehyde content of at most about 0.5 weight percent. Preferably, the dispersions have a free formaldehyde content of less than about 0.2 weight percent, most preferably less than about 0.1 weight percent. The dispersions preferably also have a free phenol content of less than about 0.2 weight percent. Also, the product of the present invention has a high viscosity of, for example, from about 200 to about 800 centipoise when measured at about 77° F. at 100 rpm with a number 6 spindle on a Brookfield viscometer.

The Resole Resins

The alkaline resole resins employed as part of the present invention may be any of the wide variety of commercially available aqueous or solvent-based phenolic resole resins. Liquid or solid phenolic resole resins, or mixtures thereof, are operative herein, with liquid resins being preferred. Low-formaldehyde containing resole resins may, however, be used to produce resole melamine crystal suspensions that have exceptionally low volatile emissions properties. Resole resins of this type are preferably formulated with low formaldehyde to phenol mole ratios in the range of from about 0.5:1 to about 3.5:1 and more desirably from about 2.5:1 to about 3:1.

The alkaline resole resin composition is prepared by combining formaldehyde and phenol at a formaldehyde to phenol mole ratio of from about 0.5:1 to 3.5:1 in the presence of a basic catalyst, wherein the catalyst to phenol mole ratio is from about 0.01 to 1:1. By "alkaline resole" herein shall mean a resole with a pH which is basic, above 7.0, and not limited to a resole using an alkali salt or metal ion. "Alkali" herein shall mean any pH basic material.

The resole resins of the present invention are further preferably formulated herein with a pH of 8.0 or above via high ratios of basic catalyst (such as NaOH) to phenol mole ratios in the range of from about 0.01:1 to about 1.0:1. Typically, hexamine is absent. The preferred base to phenol mole ratio is about 0.1:1 to 0.3:1. A preferred level of base catalyst in the present invention is relatively large, for example 18–20 mole present based on phenol. It has been found that relatively high levels of alkali catalyst are useful to effect a very high degree of phenol conversion to methylol phenols with a low molar ratio of formaldehyde. The result is an aqueous resin solution with relatively low levels of free monomers (both formaldehyde and phenol) and relatively high levels of methylolated phenol, such high levels being particularly suitable for the subsequent acid catalyzed reaction with melamine. The reaction products are relatively high solids at this point but retain for some uses the desired water solubility characteristics of the methylol phenol resin components in an acidic binder solution.

The resole resins of the current invention show a high level of phenol conversion to methylol phenol with low formaldehyde to phenol mole ratios. This gives molded products made from the resins a very low levels of free or uncombined formaldehyde. The high levels of conversion of phenol to resin is promoted by the high levels of alkali catalyst.

The Melamine Crystals

The term "melamine crystal" means melamine, per se, and underivatized in powder, crystalline, or flake form. This shall include, for example, and not by way of limitation, MCI's GP (General Purpose), non-recrystallized grade of melamine powder. Melamine crystal herein shall also mean 1,3,5-triazine-2,4,6-triamine; 2,4,6-triamino-S-triazine; and cyanurotriamide.

Process for Preparing the Binder

The stabilized phenolic resin melamine dispersion may be prepared be applying solid melamine crystal to an alkaline resole resin composition. A-stage unreacted, uncured but curable compositions of the current invention are thus, prepared by dispersing any suitably ground melamine crystal powder in the cold (preferably about 30 to about 60° F.), low free formaldehyde-containing resole prepared using high levels of alkali catalyst.

The alkaline resole resin composition comprises the reaction product of combining formaldehyde and phenol at a formaldehyde to phenol mole ratio of about 0.5:1 to about 3.5:1 in the presence of a basic catalyst. The melamine crystal is mixed, in the absence of heating, with the alkaline resole resin for at least about 24 hours at a temperature from about 30 to about 75° F. until the crystals become finely dispersed in the alkaline resole composition and a dispersion results which has a low free formaldehyde content of less than about 0.5 weight percent. For example, while not preferred, the mixture may be mixed for 24–36 hours at about 71 to about 75° F. or about 72 to about 96 hours at about 61 to about 70° F. However, mixtures made at temperatures above about 60° F. would be refrigerated to a low, e.g., 10 to 45° F. temperature, quickly (within about 1–2 hours) after mixing achieved the desired fine crystals and low formaldehyde content. Preferably, the mixing occurs under refrigeration at a very low temperature from about 30 to about 60° F. and for a period of at least about 96 hours. More preferably, the mixing occurs at a temperature from about 30 to about 45° F. for about 96 to about 192 hours to achieve the desired dispersion having fine crystals and low free formaldehyde content. Moreover, the mixture contains high levels of base to have a pH of about 8.5 to about 11. Typical bases such as potassium hydroxide and/or sodium hydroxide may be employed.

The melamine crystal is mixed with the alkaline resole resin at a melamine crystal to phenol mole ratio of about 0.01:1 to about 1:1. Preferred melamine to phenol mole ratios are in the range of about 0.20:1 to about 0.75:1. Melamine crystal solids to phenolic solids weight ratios of about 5:95 to 35:65 are preferred. Typically, the mixture includes about 20 to about 40 weight percent melamine crystals. It has been observed that clear films of the hot molten B-staged resole melamine dispersion do not form at 155° C. (some melamine remains undissolved) when levels of melamine crystal above about 35 weight percent are used. A melamine level of about 15 weight percent of total solids is most preferred.

During the "cold" mixing (conditioning) step, the solid melamine/liquid formaldehyde reaction forms methylol melamine. In contrast, U.S. Pat. No. 5,296,584 to Walisser avoids formation of methylol by not employing conditioning. U.S. Pat. No. 4,960,826 to Walisser forms an intermediate, which contains methylol melamine in solution form, by a "hot" conditioning step. However, this intermediate is not a useful A-stage resin. If the intermediate were cooled to room temperature, the methylol melamine would precipitate. The '826 patent teaches away from such precipitation because it desires a fully water soluble resole and melamine A-stage final composition. Thus, the '826 patent employs an acidification step to convert the methylol melamine into soluble melamine/formaldehyde polymer. In contrast, the present invention permits methylol melamine to be in solution with a portion potentially precipitated on the dispersed melamine crystals as explained below. Thus, the present invention removes formaldehyde by converting it to methylol melamine during a "cold" conditioning step. Moreover, rather than crystallize on the bottom of the reaction or storage vessel, the methylol melamine advantageously remains dispersed.

As a result of the high level of basic catalyst employed to make the alkaline resole resin, the alkaline resole resin of the present invention has only about 6 to 11 weight percent free formaldehyde based on phenolic resole resin solids. This is about 3 to about 6 weight percent free formaldehyde based on total composition (solids and liquid).

Thus, due to conversion of formaldehyde to methylol melamine, the resulting A-stage resin of the present invention has from about 6 to about 12 weight percent methylol melamine based on total composition. As mentioned above, methylol melamine readily crystallizes from refrigerated aqueous phenolic resin solutions. However, under the refrigerated reaction conditions of the present invention, the methylol melamine remains homogeneously dispersed with the melamine dispersion.

During mixing, the melamine crystals "pulp", i.e., swell, and form a fine dispersion. As a result of the mixing, the dispersion achieves exceptionally low levels of free formaldehyde and free phenol, as discussed above, without the use of formaldehyde or phenol scavengers (thus, resulting in an absence of dissolved methylol urea monomers and hexamine), or application of heat.

It has also been found that curing of resole melamine crystal dispersions which are pH neutral or mildly alkaline does not appear to produce preferred melamine phenolic copolymer formation, as evidenced by the higher formaldehyde emissions from subsequent curing, and by the red coloration of the cured binder and molded articles made therefrom. By the present invention, in fact, the red coloration caused by methylolphenol condensation is avoided and instead a yellow color is produced indicative of the aminomethyl phenolic material being produced.

It has therefore been found advantageous to acidify the dispersions of the present invention, to a moderately low pH in the range from about 2.5 to about 6 with any suitable acid just prior to application to the glass fiber matrix. The lower the pH, the more melamine-phenol condensation is achieved as opposed to phenol-phenol or methylol phenol condensation. The very low pH (pH below about 2.0) of acid catalyzed condensations of methylol phenol is avoided.

Strong carboxylic acids, such as oxalic acid, may be employed. Strongly acidic monovalent and low molecular weight acids such as sulfamic, nitric, or methane sulfonic are preferred acids. An acid with a low molecular weight is preferred because of the presence in the resole resins of the present invention of a large amount of alkali. This alkali, used as a catalyst to make the resole resin, requires neutralization. Thus, a low molecular weight acid is preferred to minimize dilution of the final C-stage polymer matrix with non-polymer forming ingredients (acid-base salts) that might otherwise reduce the strength and temperature performance properties of the cured composition. A "latent acid" (a pH neutral substance that chemically reacts, usually with application of heat to form an acidic condition) may also be used. A latent acid such as ammonium sulfate is preferred.

Thus, after the dispersion has been formed by the mixing step, it is converted to a water soluble A-stage, unreacted, uncured but curable binder composition by adding to the dispersion an acid such as oxalic acid, sulfamic acid, nitric acid, or methane sulfonic acid in an amount sufficient to drop the pH to a level of from 2.5 to 6. The temperature when the binder and acid are mixed is not sufficient to dissolve the melamine or to initiate any polymerization between the melamine and the resole. Then the binder and substrate mixture is heated to cure the binder.

According to the method of the present invention, the uncured, unreacted resole melamine crystal suspensions, also referred to herein as dispersions, may be applied with any suitably acidic catalyst directly to a substrate such as, for example, spun glass fibers, through, for example, conventional air atomization nozzles or spinning disc atomization equipment. The product of the present invention is particularly suited to higher solid applications in the range of about 10 to about 20 percent where quantities of water needed to effect complete dissolution of the melamine are not available. In this manner is formed a glass wool blanket or other substrate on which is located the uncured, unreacted molten resin dispersion of melamine crystal in the resole resin binder of the present invention. Additionally, the binder comprising the melamine resole resin dispersion and a suitable acid may be impregnated directly into woven or non-woven glass, or carbon. The impregnated glass wool blanket or fabric is then molded under conditions sufficient to cause the resin binder to flow and cure as described above.

The present invention is further explained by the following non-limiting examples.

EXAMPLE 1

A typical procedure to make phenolic resin/melamine dispersion is as follows.

Mix 25 parts by weight of water and 100 parts by weight of phenol into a reactor. Then add 13.3 parts by weight 50% sodium hydroxide solution and 10.4 parts by weight 45% potassium hydroxide solution. Then add 191.1 parts by weight 50% formaldehyde solution at a rate of about 2 parts per minute to the mixture (to get an overall 3:1 formaldehyde to phenol mole ratio) while maintaining the mixture temperature at about 50° C. under a vacuum of at least about 24 inches of mercury. After all the formaldehyde is added, hold the mixture at 50° C. under vacuum for 15 minutes. Then reduce the vacuum to about 24 inches of mercury to allow the temperature to rise to about 60° C. in 15 minutes. Hold the mixture at 60° C. under vacuum for 200 minutes. Reflux cool with cooling water to 40° C. and subsequently chill to less than 10° C. (about 43° F.). The free phenol of the phenolic resole resin product is in the range of 0.2–0.7 weight percent based on phenolic resole resin solids. The free formaldehyde content of the phenolic resole resin product is in the range of 6 to 11% weight percent based on phenolic resole resin solids.

Add about 225 parts by weight of water to the resin and maintain the temperature below 10° C.

Discharge the produced resin to a refrigerated storage tank. With resin temperature below about 10° C., add 31.6 parts by weight melamine crystals, such as that sold by Melamine Chemicals, Inc., Donaldsonville, La., in an "unground" particle size (typically having a mean particle size of about 47 microns). Then agitate the resin and melamine mixture for about 96 hours. This results in a dispersion comprising a sodium hydroxide and potassium hydroxide catalyzed resole containing dispersed melamine crystals. The free formaldehyde of the product should be about 0.1 to about 0.5 weight percent and the free phenol should be about 0.1 to about 0.2 weight percent (which is about 0.3 to about 1.7 weight percent free formaldehyde and about 0.3 to about 0.6 weight percent free phenol based on total solids in the product).

EXAMPLE 2

A phenolic resin/melamine dispersion was mixed with catalysts as follows:

A dispersion of melamine in 1:3 mole ratio phenol:formaldehyde resole resin was made essentially by the procedure of Example 1. The dispersion had a specific gravity of 9.5 pounds/gallon at 10° C. The total oven solids content of the dispersion premix was measured at 32.9%. The Brookfield viscosity thixotropic index of the dispersion was determined at 45° F. and 77° F. as follows:

TABLE 1

| Brookfield viscosity spindle no. 6 at RPM | Viscosity centipoise at 45° F. | Viscosity centipoise at 77° F. |
| --- | --- | --- |
| 10 | 4500 | 2250 |
| 20 | 2500 | 1250 |
| 50 | 1160 | 640 |
| 100 | 700 | 400 |

As seen in TABLE 1, doubling the shear rate decreases viscosity by about 40%.

The dispersion contained 82.5 weight percent phenol/formaldehyde resole resin solids and 17.5 weight percent melamine crystal solids. The dispersion had been mixed with good agitation for five days at about 5 to about 10° C.

The mixture had gelled (to be a thixotropic gel) during storage at about 10° C. without agitation, but was readily liquified with mild agitation. Two 115 gallon batches of ammonium sulfate catalyzed binder, designated "Mixture 1" were made. Each batch had the composition listed in TABLE 2. Also made were two 120 gallon batches of a combination ammonium sulfate, sulfamic acid and ammonia binder designated "Mixture 2". Each batch had the composition listed in TABLE 3.

TABLE 2

MIXTURE 1

|  | Solids. lbs | Liquid. lbs | Gallons |
| --- | --- | --- | --- |
| Dispersion Premix having 30 weight % bonding solids | 237.7 | 792.3 | 83.4 |
| Ammonium sulfate at 28.9 weight % concentration in water | 27.1 | 93.8 |  |
| Silane at 40 weight % concentration in water | 0.71 | 1.78 |  |
| *SL-985A Borden oil emulsion at 40 weight % concentration in water | 9.5 | 23.8 |  |
| Water** |  | 134 | 16 |
| TOTAL | 275 | 1045.7 |  |

*Available from Borden, Inc., Columbus, Ohio
**Water was added to adjust total solids content to a target of 26.3 weight % oven solids to make a total of 115 gallons of Mixture 1.

TABLE 3

MIXTURE 2

|  | Solids lbs. | Liquid lbs. | Gallons |
| --- | --- | --- | --- |
| Dispersion Premix having 30 weight % bonding solids | 237.7 | 792.3 | 83.4 |
| Sulfamic acid at 100 weight % concentration | 30.7 | 30.7 |  |
| Ammonium sulfate at 28.9 weight % concentration in water | 6.4 | 22.1 |  |
| Ammonia |  | 4.0 |  |
| Silane at 40 weight % concentration in water | 0.71 | 1.78 |  |
| *SL-985A Borden oil emulsion at 40 weight % concentration in water | 9.5 | 23.8 |  |
| **Water |  | 209 | 25 |
| TOTAL | 285 | 1084 |  |

*Available from Borden, Inc., Columbus, Ohio
**Sufficient water was added to adjust total solids content to a target of 26.3 % oven solids to make 120 gallons total of Mixture 2.

The pH of this straight sulfate mix (Mixture 1) was 9.66 before the sulfate was added and 9.28 after 2 hours mixing with the sulfate added. The pH of the combination mix (Mixture 2) was 5.8–5.9 before ammonia addition and 7.9–8.0 after ammonia addition. 185 gallons of the straight sulfate mix was applied through conversion spray nozzles to spin glass wool to form a resinated glass wool blanket. The blanket was then passed through a curing oven to form an insulating air duct board (a thermal insulation used to line the walls of air conditioning ducting). 170 gallons of the combination mix (Mixture 2) was also applied in a similar manner. Product was collected from each run for testing. All product collected had good strength properties and no trimethyl amine odor.

The presence of ammonia in Mixture 2 does not adversely affect the final product (cause TMA formation) as the formaldehyde content of the mix was very low before the ammonia was added thereby preventing formation of hexamine.

The present invention achieves melamine-resole dispersions having extremely low levels of free formaldehyde while minimizing or eliminating the use of formaldehyde scavengers, such as urea and ammonia (which forms TMA odors in the finished product).

While specific embodiments of the method and apparatus aspects of the invention have been shown and described, it should be apparent that many modifications can be made thereto without departing from the spirit and scope of the invention. Accordingly, the invention is not limited by the foregoing description, but is only limited by the scope of the claims appended hereto.

I claim:

1. An A-stage stabilized phenolic resin melamine dispersion comprising:
   a liquid alkaline resole resin composition comprising the reaction product of combining formaldehyde and phenol at a formaldehyde to phenol mole ratio of about 2.5:1 to about 3.5:1 in the presence of a basic catalyst, wherein the catalyst to phenol mole ratio is from about 0.01 to 1:1;
   solid melamine crystal dispersed throughout the resin composition, the melamine crystal to phenol mole ratio being from about 0.01:1 to about 1:1;
   a free formaldehyde content of at most about 0.5 weight percent; and
   methylol melamine.

2. The dispersion of claim 1, wherein there is an absence of formaldehyde scavengers.

3. The dispersion of claim 1, wherein the free formaldehyde content is at most about 0.2 weight percent.

4. The dispersion of claim 1, wherein the free phenol content is at most about 0.2 weight percent.

5. The dispersion of claim 1, wherein the formaldehyde to phenol mole ratio is from about 3:1 to about 3.5:1.

6. The dispersion of claim 1, wherein the dispersion has a pH of about 8.5 to about 11.

7. The dispersion of claim 1, wherein the melamine crystal content of the dispersion is about 20 to about 40 weight percent.

8. The dispersion of claim 1, wherein the free formaldehyde content is at most about 0.1 weight percent.

9. The dispersion of claim 1, wherein the dispersion has a Brookfield viscosity of about 200 to about 800 centipoise measured at about 77° F. and about 100 rpm, using a number 6 spindle.

10. The dispersion of claim 1, wherein the melamine crystal to phenol mole ratio ranges from about 0.20:1 to about 0.75:1.

11. The composition of claim 1, wherein the liquid alkaline resole resin composition comprises the reaction product of combining the formaldehyde and the phenol in the presence of basic catalyst present in an amount of about 18 to about 20 mole percent based on the phenol.

12. The composition of claim 1, wherein the basic catalyst to phenol mole ratio is from about 0.1:1 to about 0.3:1.

13. A method for preparing an A-stage stabilized phenolic resin melamine dispersion comprising the steps of:
   adding solid melamine crystal to an alkaline liquid resole resin composition at a temperature of about 30 to about 75° F., the alkaline resole resin composition comprising the reaction product of combining formaldehyde and phenol at a formaldehyde to phenol mole ratio of about 0.5:1 to about 3.5:1 in the presence of a basic catalyst, wherein the catalyst to phenol mole ratio is from about 0.01 to about 1:1 and the melamine crystal is provided at a melamine crystal to phenol mole ratio of about 0.01:1 to about 1:1;
   mixing the melamine crystal and the alkaline resole resin for at least about 24 hours at a temperature of about 30 to about 75° F. to cause the crystals to become finely dispersed in the alkaline resole composition and result in a dispersion having a free formaldehyde content of less than 0.5 weight percent of the dispersion based on total weight of solids and liquids of the dispersion, and containing methylol melamine.

14. The method of claim 13, wherein the mixing occurs for at least about 96 hours at a temperature of about 30 to about 60° F.

15. The method of claim 13, wherein there is an absence of formaldehyde scavengers.

16. The method of claim 13, wherein the melamine crystals pulp during the mixing step, to become finely dispersed.

17. The method of claim 13, wherein the mixing occurs for at least about 96 hours, at temperatures between about 30° F. and about 45° F.

18. The method of claim 13, wherein the dispersion has a free formaldehyde content of at most about 0.2 weight percent of the dispersion.

19. The method of claim 13, wherein the dispersion has a free phenol content of at most about 0.2 weight percent of the dispersion.

20. The method of claim 13, wherein the formaldehyde to phenol mole ratio is about 2.5:1 to about 3.5:1.

21. The method of claim 20, wherein the formaldehyde to phenol mole ratio is about 3:1 to about 3.5:1.

22. The method of claim 13, wherein the dispersion has a pH of about 8.5 to about 11 during the mixing step.

23. The method of claim 13, wherein the dispersion has a melamine crystal content from about 20 to about 40 weight percent of the dispersion.

24. The method of claim 13, wherein the dispersion has a free formaldehyde content of at most about 0.1 weight percent of the dispersion.

25. The method of claim 13, wherein the mixing occurs for about 96 to about 192 hours.

26. The method of claim 13, wherein the melamine crystal and alkaline resole resin are refrigerated to obtain an about 30 to about 60° F. temperature during mixing.

27. The method of claim 13, wherein the dispersion is mixed sufficiently to have a Brookfield viscosity of about 200 to about 800 centipoise measured at about 77° F. and about 100 rpm using a number 6 spindle.

28. A dispersion made by the method of claim 13.

29. The method of claim 13, wherein the finely dispersed crystals and free formaldehyde content of less than 0.5 weight percent are achieved prior to addition of acid catalyst.

30. The method of claim 29, further comprising acidifying the dispersion after the mixing step to a pH from about 2.5 to about 6.

31. A stabilized phenolic resin melamine dispersion made by the method of claim 13.

32. The method of claim 13, wherein the liquid alkaline resole resin composition comprises the reaction product of combining the formaldehyde and the phenol in the presence of basic catalyst present in an amount of about 18 to about 20 mole percent based on the phenol.

33. The method of claim 13, wherein the basic catalyst to phenol mole ratio is from about 0.1:1 to about 0.3:1.

* * * * *